(12) United States Patent
Adileh et al.

(10) Patent No.: US 8,822,623 B2
(45) Date of Patent: Sep. 2, 2014

(54) HIGH INDEX AND HIGH IMPACT RESISTANT POLY(THIO)URETHANE/UREA MATERIAL, METHOD OF MANUFACTURING SAME AND ITS USE IN THE OPTICAL FIELD

(75) Inventors: Fadi O. Adileh, Tampa, FL (US); Aref Ben Ahmed Jallouli, Largo, FL (US); Peiqi Jiang, Tarpon Spring, FL (US); Joey Oliveros Obordo, Seminole, FL (US); Yassin Yusef Turshani, Largo, FL (US); Steven Weber, Clearwater, FL (US)

(73) Assignee: Essilor International (Compagnie Generale d'Optique), Charenton le Pont (FR)

( * ) Notice: Subject to any disclaimer, the term of this patent is extended or adjusted under 35 U.S.C. 154(b) by 441 days.

(21) Appl. No.: 12/838,044

(22) Filed: Jul. 16, 2010

(65) Prior Publication Data

US 2011/0009591 A1    Jan. 13, 2011

Related U.S. Application Data

(63) Continuation-in-part of application No. 09/992,054, filed on Nov. 14, 2001, now Pat. No. 7,767,779.

(51) Int. Cl.
*C08G 18/52* (2006.01)
*C08G 18/48* (2006.01)
*C08G 18/10* (2006.01)
*C08G 18/32* (2006.01)
*C08G 18/38* (2006.01)

(52) U.S. Cl.
USPC ................................ 528/64; 528/60; 359/642

(58) Field of Classification Search
USPC ....................... 528/60, 64; 359/642
See application file for complete search history.

(56) References Cited

U.S. PATENT DOCUMENTS

| | | | | | |
|---|---|---|---|---|---|
| 2,916,519 | A | * | 12/1959 | Wegner et al. | 568/46 |
| 3,027,354 | A | * | 3/1962 | Muller et al. | 528/76 |
| 3,056,841 | A | | 10/1962 | Sagebarth | 568/66 |
| 3,413,265 | A | | 11/1968 | Bertozzi | 528/12 |
| 3,954,723 | A | * | 5/1976 | Oswald | 528/374 |
| 4,059,570 | A | * | 11/1977 | Oswald | 528/76 |
| 4,254,229 | A | | 3/1981 | Schwindt et al. | 521/163 |
| 5,191,055 | A | | 3/1993 | Kanemura et al. | 528/77 |
| 5,352,758 | A | | 10/1994 | Kanemura et al. | 528/85 |
| 5,484,872 | A | | 1/1996 | Kanesaki et al. | 528/73 |
| 5,837,797 | A | | 11/1998 | Okazaki et al. | 528/76 |
| 5,942,158 | A | | 8/1999 | Okorafor et al. | 252/586 |
| 5,995,206 | A | | 9/1999 | Okazaki et al. | 428/542.8 |
| 5,962,619 | A | * | 10/1999 | Seneker et al. | 528/64 |
| 5,973,098 | A | | 10/1999 | Keita et al. | 528/65 |
| 6,100,362 | A | | 8/2000 | Okazaki et al. | 528/76 |
| 6,127,505 | A | | 10/2000 | Slagel | 528/61 |
| 7,767,779 | B2 | * | 8/2010 | Jallouli et al. | 528/60 |
| 2004/0147708 | A1 | * | 7/2004 | Yoshimura et al. | 528/68 |
| 2010/0234552 | A1 | * | 9/2010 | Kitahara | 528/64 |

FOREIGN PATENT DOCUMENTS

| | | |
|---|---|---|
| SU | 1085991 | 4/1984 |
| WO | WO 01/36507 | 11/1800 |
| WO | WO 01/36508 | 11/2000 |
| WO | WO 01/70841 | 3/2001 |
| WO | WO 01/36507 A1 * | 5/2001 |
| WO | WO 01/36508 A1 * | 5/2001 |

OTHER PUBLICATIONS

Office Communication issued in U.S. Appl. No. 09/992,054 mailed on Jul. 1, 2003.
Office Communication issued in U.S. Appl. No. 09/992,054 mailed on Aug. 26, 2004.
Office Communication issued in U.S. Appl. No. 09/992,054 mailed on Sep. 20, 2005.
Office Communication issued in U.S. Appl. No. 09/992,054 mailed on Jun. 1, 2006.
Office Communication issued in U.S. Appl. No. 09/992,054 mailed on Nov. 8, 2006.
Office Communication issued in U.S. Appl. No. 09/992,054 mailed on May 2, 2007.
Office Communication issued in U.S. Appl. No. 09/992,054 mailed on Oct. 18, 2007.
Office Communication issued in U.S. Appl. No. 09/992,054 mailed on Mar. 21, 2008.
Office Communication issued in U.S. Appl. No. 09/992,054 mailed on Dec. 17, 2008.
Office Communication issued in U.S. Appl. No. 09/992,054 mailed on Nov. 16, 2009.

* cited by examiner

*Primary Examiner* — Rabon Sergent
(74) *Attorney, Agent, or Firm* — Fulbright & Jaworski LLP

(57) ABSTRACT

A transparent, non elastomeric, high refractive index, impact resistant poly(thio)urethane/urea material comprising the reaction product of: a) at least one (α, ω)-diiso(thio)cyanate cycloaliphatic or aromatic polysulfide prepolymer, and b) at least one aromatic primary diamine, in an equivalent molar ratio amine function/iso(thio)cyanate function ranging from 0.5 to 2, wherein, said prepolymer and diamine are free from disulfide (—S—S—) linkage and wherein the (α, ω)-diiso (thio)cyanate polysulfide prepolymer is the reaction product of at least one cycloaliphatic or aromatic diiso(thio)cyanate and at least one (α, ω)-diol prepolymer.

19 Claims, No Drawings

HIGH INDEX AND HIGH IMPACT RESISTANT POLY(THIO)URETHANE/UREA MATERIAL, METHOD OF MANUFACTURING SAME AND ITS USE IN THE OPTICAL FIELD

CROSS-REFERENCE TO RELATED APPLICATIONS

This is application is a continuation-in-part of U.S. application Ser. No. 09/992,054, filed 14 Nov. 2001, which issued as U.S. Pat. No. 7,767,779, on 3 Aug. 2010. The entire contents of the referenced application is incorporated herein by reference.

BACKGROUND OF THE INVENTION

1. Field of the Invention

The present invention relates to a rigid, optically transparent, high index, impact resistant poly(thio)urethane/urea material, which is particularly suited for making optical articles such as sun lenses, ophthalmic lenses and protective lenses.

2. Description of Related Art

Plastic materials are widely used in the optical field and particularly in the ophthalmic field for their lightness, high impact resistance and tintable capability by immersion in a bath containing an organic dye.

Optically transparent plastic materials having a high refractive index, higher than 1.53, are of major interest since they render it possible to manufacture optical articles such as lenses of lower thickness for an equivalent corrective power (optical power).

Of course, this increase in refractive index of the material shall not be at the expense of the other valuable properties such as transparency and impact resistance of the material.

Preferably, other required properties for the lens material are:
  non yellowness;
  ability to be treated (by hard coats, primers, . . . );
  density as low as possible—ageing resistance (especially photodegradation resistance).

U.S. Pat. No. 6,127,505 discloses a transparent, non-elastomeric, high index, high impact resistant polyurethane material which is a reaction product of:
  a polyurethane prepolymer prepared by reaction of an aliphatic or cycloaliphatic diisocyanate with at least one OH containing intermediate having a rate average molecular weight of from about 400 to 2.000 selected from the group consisting of polyester glycols, polycaprolactone glycols, polyether glycols, polycarbonate glycols and mixtures thereof, in an equivalent ratio of about 2.5 to 4.0 NCO/1.0 OH; and
  at least one first aromatic diamine curing agent selected from the group consisting of 2,4-diamino-3,5, diethyl-toluene, 2,6-diamino-3,5,diethyl-toluene and mixtures thereof in an equivalent ratio of about 0.85 to 1.02 NH$_2$/1.0 NCO.

Unfortunately, the polyurethanes obtained have relatively low refractive index, n$_D^{25}$, of at most 1.53.

SUMMARY OF THE INVENTION

Thus, the aim of the present invention is i.a. to provide an optically transparent, rigid, high index, impact resistant material that would particularly be useful for making optical articles.

By high refractive index material, there is intended in the present invention a material having a refractive index, n$_D^{25}$, higher than 1.53, preferably of at least 1.55 and most preferably of at least 1.57.

The above objective is reached according to the invention by providing a transparent, non elastomeric, high refractive index, impact resistant poly(thio)urethane/urea material comprising the reaction product of:

a) at least one ($\alpha$, $\omega$)-di-NCX prepolymer in which X represent O or S and having a number average molecular weight ranging from 100 to 3000 g mol$^{-1}$, said prepolymer being free from disulfide (—S—S—) linkage and b) at least one aromatic primary diamine in a molar equivalent ratio NH$_2$/NCX ranging from 0.5 to 2, preferably 0.90 to 1.10, more preferably from 0.93 to 0.95, said aromatic primary diamine being free from disulfide (—S—S—) linkage, and c) at least one of the prepolymer or the diamine containing one or more sulphur atoms.

The invention further concerns optical articles such as sun lenses, ophthalmic lenses and protective lenses made of the poly(thio)urethane/urea material defined above.

The ($\alpha$,$\omega$)-diiso(thio)cyanate prepolymer is preferably an ($\alpha$,$\omega$)-diiso(thio)cyanate cycloaliphatic or aromatic prepolymer and most preferably such a prepolymer containing one or more sulphur atoms in its chain.

These prepolymers can be prepared by reacting an ($\alpha$, $\omega$)-diol or dithiol prepolymer, preferably further containing at least one sulphur atom in its chain, with one or more cycloaliphatic or aromatic diisocyanate or diisothiocyanate according to the following scheme:

($\alpha$,$\omega$)-di-XH prepolymer(I)+cycloaliphatic or aromatic di-NCX(II)→($\alpha$,$\omega$)-di-NCX prepolymer (III)

with X=O or S.

The preferred prepolymers (I) are ($\alpha$,$\omega$)-dithiol prepolymers and ($\alpha$,$\omega$)-diol prepolymers, further containing at least one sulphur atom in their chains.

Among these prepolymers there could be cited the following prepolymers:

Prepolymers of Formula:

where x and y are such that $\overline{M}_n$ of the resulting prepolymer (III) ranges from 100 to 3000 g mol$^{-1}$ (these prepolymers can be made by polymerizing sulfide monomers, such as ethylene sulfide and 2-mercaptoethyl sulfide (DMES));

Prepolymers Resulting from the Polymerization of Diepisulfides of Formula:

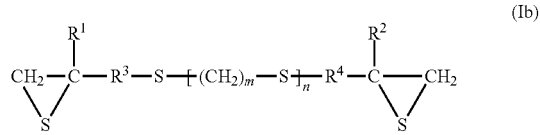

in which R$^1$ and R$^2$ are, independently from each other, H, alkyl, aryl, alkoxy, alkylthio or arylthio; R$^3$ and R$^4$ are, independently from each other,

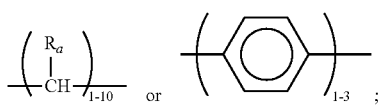

$R_a$ designates H, alkyl, aryl, alkoxy, aryloxy, alkylthio or arylthio and, n is an integer from 0 to 4 and m is an integer from 1 to 6, and Prepolymers of Formula (Ic):

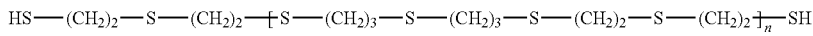

where n is such that the number average molecular weight ($\overline{M}_n$) of the prepolymer ranges from 500 to 1500, preferably from 650 to 1350 g mol$^{-1}$.

Prepolymers of Formula (Id):

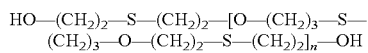

wherein n is an integer ranging from 1 to 6, preferably from 2 to 5.

These polysulfide ($\alpha$, $\omega$)-diol prepolymers can be obtained by known synthetic routes, for example by reaction of allylsulfide $CH_2=CH—CH_2—S—CH_2—CH=CH_2$ with $HO—CH_2—CH_2—S—CH_2—CH_2—OH$.

Prepolymers of Formula (Ie):

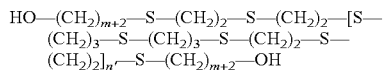

wherein m is an integer ranging from 1 to 4, preferably 1 or 2, and n' is an integer ranging from 1 to 6, preferably from 2 to 5.

These polysulfide ($\alpha$, $\omega$)-diol prepolymers can be obtained by known synthetic routes, for example trough the following scheme which uses an appropriate unsaturated alcohol and a polysulfide ($\alpha$, $\omega$)-dithiol of formula (Ic), the synthesis of which will be described later:

HS—(CH$_2$)$_2$—S—(CH$_2$)$_2$—[S—(CH$_2$)$_3$—S—(CH$_2$)$_3$—S—(CH$_2$)$_2$—S—(CH$_2$)$_2$]$_n$—SH+
2CH$_2$=CH—(CH$_2$)$_m$—OH→Prepolymer of formula (Ie)

The mixture is usually heated at a temperature ranging from 30° C. to 80° C., preferably 40° C. to 70° C., typically 65° C., for 24 to 90 hrs. The amount of initiator usually ranges from 0.05 to 10%, preferably 1 to 8%, by weight of the polymerizable monomers in the mixture, typically 2.5%. The initiator may be added to the mixture in one shot at the beginning of the reaction or in several shots during the course of the reaction.

Prepolymers of Formula (If):

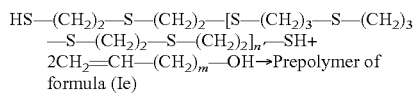

wherein n' is an integer ranging from 1 to 6, preferably from 2 to 5.

These polysulfide ($\alpha$, $\omega$)-diol prepolymers can be obtained by known synthetic routes, for example trough the following 2-step scheme, using a molar ratio AS/DMES>1 in the first step:

Step 1

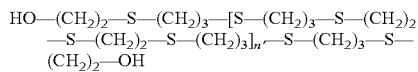

Step 2

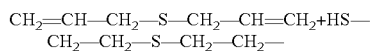

The preferred polysulfide ($\alpha$, $\omega$)-diol prepolymers are compounds of formula (Ie), in which m is preferably equal to 1 or 2.

Mixtures of at least one ($\alpha$, $\omega$)-diol prepolymer and at least one ($\alpha$, $\omega$)-dithiol prepolymer can also be used.

A preferred class of diepisulfides is comprised of diepisulfides of formula:

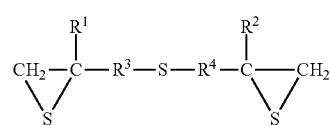

in which R$^1$, R$^2$, R$^3$ and R$^4$ are defined as above.

In R$^1$, R$^2$, R$^3$ and R$^4$ the alkyl and alkoxy groups are preferably C$_1$-C$_6$, more preferably C$_1$-C$_4$ alkyl and alkoxy groups such as methyl, ethyl, propyl, butyl, methoxy, ethoxy, propoxy and butoxy.

The preferred diepisulfides are those of formula:

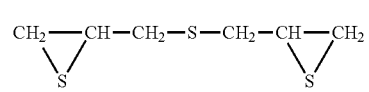

and hyperbranched prepolymers resulting from the polymerization of the above mentioned diepisulfides, in particular diepisulfides of formulas (I''$_b$) with DMES.

The prepolymers of formula (I$_c$) constitute a new class of polysulfides. These new soft polysulfides have high refractive indexes and can be prepared by thermal and/or photopolymerization, in the presence of an initiator, of 2-mercaptoethylsulfide (DMES) corresponding formula HS—CH$_2$CH$_2$—S—CH$_2$CH$_2$—SH and allylsulfide (AS) corresponding formula CH$_2$=CHCH$_2$—S—CH$_2$—CH=CH$_2$, with a molar ratio AS/DMES<1. The mixture is usually heated at a temperature ranging from 30° C. to 80° C., preferably 40° C. to 70° C., typically 65° C., for 48 to 90 hrs. The amount of initiator usually ranges from 0.05 to 10%, preferably 1 to 8%, by weight of the polymerizable monomers in the mixture, typically 5.3%. The initiator may be added to the mixture in one shot at the beginning of the polymerization or in several shots during the course of the polymerization process.

Preferably, prepolymers of formula (Ic) are prepared by photopolymerization in the presence of a photoinitiator.

The refractive index of these prepolymers (I$_c$) typically ranges from 1.57 to 1.62, preferably from 1.59 to 1.615.

Photopolymerization of prepolymers of formula (Ic) is effected by mixing DMES and AS in the required proportions, such that the molar ratio allyl/SH is less than 2, preferably less than 1 and more preferably less than 0.8, adding at least one photoinitiator and irradiating the mixture, preferably with an UV light. Preferably, UV light wavelength will range from 320 to 390 nm. UV light intensity typically ranges from 40 mW to 90 mW and total exposure time to UV light, either in one shot or several shots, ranges from 250 to 1650 seconds, preferably 300 to 1500 and more preferably 600 to 1000 seconds.

Any classical photoinitiator, in usual amount can be used for the photopolymerization process. Preferred photoinitiators are 1-hydroxycyclohexyl phenyl ketone (Irgacure® 184) and 2-hydroxy-2-methyl-1-phenylpropan-1-one (Darocur® 1173). The amount of photoinitiator used will usually range from 0.05% to 10% by weight, preferably from 1% to 5%, and more preferably from 1 to 2% by weight, based on the total weight of the polymerizable monomers present in the polymerization mixture.

Although the photoinitiator may be added to the polymerization mixture in one shot, generally before starting irradiation, it is preferred to add the photoinitiator in several shots during irradiation process of the mixture. With the addition of the photoinitiator in several shots, higher conversion rates of the allylsulfide and higher refractive indexes are obtained.

Similarly, thermal polymerization is effected by simply mixing appropriate amounts of DMES and AS, adding to the mixture an effective amount of at least one thermal radical initiator, and heating the mixture at a temperature ranging from 30° C. to 80° C., preferably from 40° C. to 70° C. Any classical thermal initiator can be used, such as di(4-tert-butylcyclohexyl) peroxydicarbonate (P16S) and 2,2'-azobisisobutyronitrile (AIBN) in usual amounts.

Typically, the amount of thermal initiator will range from 0.05 to 10%, preferably 1 to 8%, by weight of the polymerizable monomers present in the mixture.

The thermal initiator may be added to the mixture in one shot at the beginning of the polymerisation or in several shots during the course of the polymerization process.

Polymerization is usually effected by bulk polymerization process but it can also be a solution polymerization process using any appropriate solvent or mixture of solvents. A preferred solvent is tetrahydrofuran (THF).

The cycloaliphatic or aromatic diiso(thio)cyanate (II) may be a cycloaliphatic or aromatic diisocyanate or a cycloaliphatic or aromatic diisothiocyanate or a mixture thereof.

Among the preferred cycloaliphatic diiso(thio)cyanate, there may be cited bis(iso(thio)cyanatemethyl)cyclohexane hexamethylene diiso(thio)cyanate and dicyclohexylmethane diiso(thio)cyanate and mixtures thereof.

The most preferred cycloaliphatic diisocyanate is 4,4'-methylenebis(cyclohexyl isocyanate), also known as HMDI, and commercially known as Desmodur® W from Bayer, having the following formula:

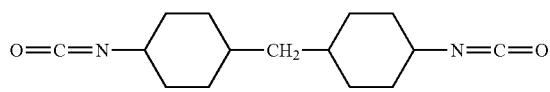 [SMILES: O=C=NC1CCC(CC2CCC(N=C=O)CC2)CC1]

and the corresponding diisothiocyanate of formula:

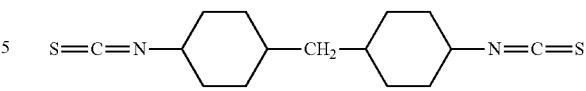

Among the aromatic diiso(thio)cyanates, there may be cited toluene diiso(thio)cyanate, phenylene diiso(thio)cyanate, ethylphenylene diiso(thio)cyanate, isopropylphenylene diiso(thio)cyanate, dimethylphenylene diiso(thio)cyanate, diethylphenylene diiso(thio)cyanate, diisopropylephenylene diiso(thio)cyanate, xylylene diiso(thio)cyanate, 4,4'-diphenylmethane diiso(thio)cyanate, naphtalene diiso(thio)cyanate.

The preferred aromatic diiso(thio)cyanate is xylylene diisocyanate (XDI).

The most preferred cycloaliphatic and aromatic diiso(thio) cyanates are Desmodur® W or the corresponding diiso(thio) cyanate or mixtures of these compounds with xylylene diisocyanate.

Usually, the molar ratio NCX/XH of the iso(thio)cyanate group to the hydroxyl or thiol group, during the reaction, ranges from 1.9 to 4.5, preferably from 3 to 3.5.

The thermal step-growth polymerization reaction of prepolymer (I) and monomer (II) can be effected with or without a polymerization catalyst. Usually, the polymerization is effected at temperature ranging from 50 to 120° C., preferably 70° C. to 120° C., more preferably 90° C. to 110° C. When no catalyst is used, of course, higher temperatures and longer times of polymerization are required.

Catalyst may be any known catalyst for the polymerization of the monomer.

Among the useful catalysts, there may be cited dimethyltindichloride, dibutyltindichloride and dibutyltindilaurate, cocatalysts or promoters such as N,N-dimethylcyclohexylamine and 1,4-diazabicyclo-[2,2,2]-octane (DABCO) could also be used with the catalyst to enhance its activity.

To prepare the final poly(thio)urethane/urea material according to the invention, the (α, ω)-di-NCX prepolymer (III) is reacted with an aromatic primary diamine according to the following scheme:

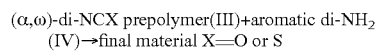

During this reaction step, in order to obtain the best properties of impact resistance for the material, it is preferred that the molar ratio $NH_2/NCX$ be kept in the range of 0.90 to 1.10 and preferably 0.93 to 0.95.

Among the aromatic primary diamines (IV) that may be used in the second reaction step, preferred aromatic diamines are those which include at least one sulphur atom in their molecules.

Among these sulphur containing aromatic amines there may be cited the amines of formula:

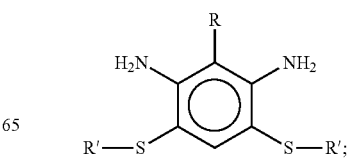

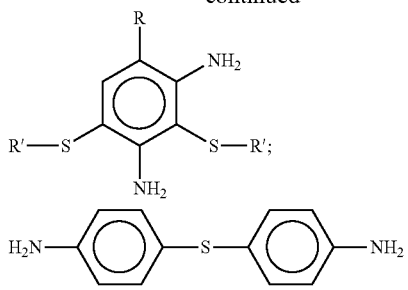

and mixtures thereof;
in which R represents a hydrogen atom or an alkyl group, preferably a $C_1$ to $C_6$ alkyl group and more preferably a methyl group, and R' is an alkyl group, preferably a $C_1$ to $C_6$ alkyl group, and more preferably a methyl group.

It is possible to replace part of the polyurea segments of the final material by adding one or more of the following monomers to the aromatic diamine in the second step of polymerization.

Thus, a polyurea segment can be replaced by a hard urethane and/or a thiourethane segment by adding a cycloaliphatic or aromatic diisocyanate such as xylylene diisocyanate and/or a diol or a dithiol such as:

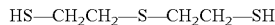

A polyurea segment can also be partly replaced by highly crosslinked areas by adding to the amine during the second step of polymerization tri and tetra alcohols and/or thiols such as:

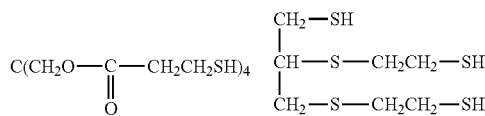

or polythiols such as those of formula:

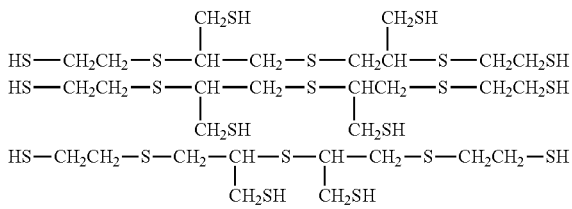

and mixtures thereof, or polyols such as those of formula:

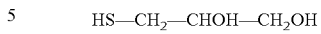

This second reaction step is effected by simply mixing prepolymer (III) with the diamine (IV) and the optional additional monomers, if any, and by heating at a temperature above 100° C., generally ranging from 100° C. to 130° C. up to obtaining the final cured poly(thio)urethane/urea material.

Conventional additives such as inhibitors, dyes, UV absorbers, perfumes, deodorants, anti-oxidants, anti-yellowing agents and release agents may be added to the material of the present invention in the usually used quantities.

These additives may be added either in the first step or in the second step of preparation of the final material, but are preferably added during the second step.

EXAMPLES

The following examples illustrate the present invention. In the examples, unless otherwise stated, all parts and percentages are by weight.

I. Examples of Synthesis of Polysulfides of Formula $(I_c)$

I.1 Preparation of Polysulfides PS1 to PS7

The polymerization reaction between AS and DMES was carried out in the presence of a photoinitiator, under UV. The equipment used to generate the UV light was an EFOS Ultracure 100 SS PLUS equipped with an optic fiber (lamp #320-60651).

The UV light was shined above the surface of the monomer mixture. The light intensities reported were measured using a UV-MO2 irradiance meter equipped with a UV-35 sensor (320-390 nm sensing wavelength). Several experimental conditions were studied in order to maximize the refractive index of the reaction product as well as the allyl conversion. The experimental conditions and the results are reported in Table I.

Two photoinitiators were tried: 1-hydroxycyclohexyl phenyl ketone (Irgacure® 184) and 2-hydroxy-2-methyl-1-phenyl-propan-1-one (Darocur® 1173). As shown in Table 1 (runs PS1 and PS2), a significant increase of the refractive index of the mixture was noticed in both cases. The refractive index of the polymer made was about the same between the two initiators. Darocur® 1173 is a liquid that is easier to handle and to disperse in the monomer mixture than Irgacure® 184 (which is a powder). Therefore, Darocur® 1173 is preferably used in the experiments.

TABLE I

| Run | DMES (g) | AS (g) | Photoinitiator (g) | Photoinitiator (%) | Molar ratio Allyl/SH | UV exposure Time (s) | UV Intensity (mW) | $n_D$(25° C.) after UV exposure | Allyl conversion (%) |
|---|---|---|---|---|---|---|---|---|---|
| PS1 a) | 10.0102 | 5.4698 | 0.3358 | 2.123 | 0.738 | 5 × 60 | 51 | 1.5800 | |
| PS2 b) | 9.9916 | 5.4661 | 0.1635 | 1.047 | 0.739 | 5 × 60 | 51 | 1.5797 | |
| PS3 b) | 10.0305 | 5.4952 | 0.3340 | 2.106 | 0.740 | 5 × 60 | 51 | 1.5813 | |
| PS4 b) | 9.9961 | 5.4676 | 0.8129 | 4.994 | 0.739 | 10 × 60 | 40 | 1.5864 c) | 58 |
| PS5 b) | 9.9914 | 5.4658 | 0.8105 | 4.982 | 0.739 | 10 × 60 | 90 | 1.5869 | 68 |

TABLE I-continued

| Run | DMES (g) | AS (g) | Photoinitiator (g) | Photoinitiator (%) | Molar ratio Allyl/SH | UV exposure Time (s) | UV Intensity (mW) | $n_D(25°\text{C.})$ after UV exposure | Allyl conversion (%) |
|---|---|---|---|---|---|---|---|---|---|
| PS6 b) | 10.0135 | 5.4802 | 5 × 0.1622 | 5.075 | 0.739 | (5 × 3 + 1) × 60 | 50 | 1.5974 d) | 93 |
| PS7 b) | 9.9991 | 5.4674 | 0.8202 | 5.036 | 0.739 | 960 | 50 | 1.5901 d) | 76 | a) Photoinitiator = Irgacure ® 184
b) Photoinitiator = Darocur ® 1173
c) $n_D^{25}$ = 1.5505 before UV exposure
d) At 40° C., $n_D$ = 1.5442 at 40° C. before UV exposure
Allyl conversion is measured by FTIR according to the following formula:

$$\text{Allyl conversion}(\%) = 100 \times \left(1 - \frac{\text{Intensity of the 1636 cm}^{-1} \text{ signal/intensity of the 1672 cm}^{-1} \text{ signal after reaction}}{\text{Intensity of the 1636 cm}^{-1} \text{ signal/intensity of the 1672}^{-1} \text{ signal before reaction}}\right)$$

The 1636 cm$^{-1}$ signal corresponds to the allyl group. The 1672 cm$^{-1}$ signal corresponds to the phenyl groups of the photoinitiator and was used as an internal reference.

As shown in Table I (PS2 and PS3), the refractive index of the polymer made shows a slight increase when the photoinitiator concentration is varied between 1.0% and 2.1%.

The increase of the UV intensity from 40 mW to 90 mW results in slight increase of the refractive index of the polymer and a higher conversion of the allyl groups (Table I, PS4 and PS5). On the other hand, the increase of the UV exposure time from 600 s to 960 s resulted in a significant increase of both the refractive index and the allyl groups conversion (Table I, PS6 and PS7).

As reported in Table I, PS6 and PS7 where polymerized with the same amount of photoinitiator added to the monomer mixture, either in five shots (PS6) or in one shot (PS7). The results show that the increase of the refractive index of the polymer and the conversion of the allyl groups were much higher when the photoinitiator was added in five shots. Under these conditions, a refractive index ($n_D^{25}$) of 1.5974 and an allyl conversion of 93% were reached.

I.2 Preparation of Polysulfides PS8 to PS10

The polymerization reaction between AS and DMES was carried out as previously mentioned using the quantities and conditions indicated in Table II. In particular a fusion lamp system equipped with a D Bulb was used for polymerizing PS10.

TABLE II

| Run | UV equipment | DMES (g) | AS (g) | Photoinitiator (g) | Photoinitiator (%) | Allyl/SH | $n_D(25°\text{C.})$ after UV exposure | Allyl conversion (%) | $\overline{M}$n (g · mol−1) |
|---|---|---|---|---|---|---|---|---|---|
| PS8 b) | Optic fiber | 90.10 | 49.32 | 5 × 1.4564 | 5.065 | 0.740 | 1.5790 | 54 | |
| PS9 b) | Optic fiber | 90.11 | 49.32 | 5 × 1.471 | 5.101 | 0.740 | 1.5816 | 57 | |
| PS10 c) | Fusion system | 90.09 | 49.39 | 5 × 1.4470 | 4.931 | 0.741 | 1.6090 | 98 | 1080 | a) $n_D^{25}$ = 1.5505 before UV exposure
b) UV exposure time = 5 × 180 + 4 × 180 = 1620 s at 50 mW
c) UV exposure time = 6 × (3 × 70) + 180 +180 = 1620 s at 50 mW I.3 Preparation of Polysulfides PS11 to PS13

The polymerization reaction between AS and DMES was usually carried out in bulk or in the presence of tetrahydrofuran (THF) as a solvent, with the conditions indicated in Table III.

The allyl conversion in the final product was similar to the one obtained in the absence of THF.

TABLE III

| Run | DMES (g) | AS (g) | THF (g) | Photoinitiator (g) | Photoinitiator (%) | Allyl/SH | UV exposure Time (min) | $n_D^{25}$ after UV exposure | Allyl Conversion (%) |
|---|---|---|---|---|---|---|---|---|---|
| PS11 | 10.0262 | 5.4818 | 0 | 5 × 0.1613 | 4.944 | 0.739 | 5 × 3.5 | 1.6084 | 97 |
| PS12 | 10.0262 | 5.4818 | 0 | 5 × 0.1613 | 4.944 | 0.739 | 5 × 3.5 + 3 × 3.5 | 1.6112 | 96 |
| PS13 | 10.0193 | 5.4799 | 13.0431 | 5 × 0.1649 | 2.808 | 0.739 | 5 × (3 × 1.2) | | 96 |

Photoinitiator = Darocur ® 1173, UV Intensity = 50 mW, Fusion lamp

I.4 Preparation of Polysulfides PS14 to PS21:

All the experiments carried out so far used an Allyl/SH molar ratio of about 0.739. In order to study the effect of this molar ratio on the properties of the polysulfides made, a series of experiments have been conducted where the Allyl/SH molar ratio was varied from 0.500 to 1.354. The experimental conditions as well as the results of these syntheses were reported in Table IV.

As shown, the refractive indexes, the allyl conversion and precipitation yields of the polysulfides were all similar to each other.

The refractive index $n_D^{25}$ was around 1.611 for most the precipitated polymers, which is higher than of the LP-33 polysulfide, a polysulfide having —S—S— linkages from Morton International ($n_D^{25}$=1.559).

Structures of the polysulfides were confirmed by H NMR and 13C NMR spectrum.

of THF, and the solution is precipitated drop-wise in two liter of methanol.

After 24 hours, the supernatant methanol solution is removed, and the white precipitate is dried under vacuum at room temperature.

The precipitation yield was about 80%. The refractive index $n_D^{25}$ of the precipitated polysulfide was 1.6140. Its molecular weight by GPC was $\overline{M}_n$=900 g×mol−1 ($\overline{M}_w/\overline{M}_n$=1.685). Its SH content measured by titration was 2.157 mmol SH/g ($\overline{M}_n$=930 g×mol$^{-1}$ based on (α, ω) SH chains).

Although the polymerization reaction between DMES and AS is successful when using a thermal radical initiator, the UV polymerization is a preferred polymerization method since the reaction times are much shorter (27 minutes in UV polymerization versus 43 hours in thermal polymerization).

TABLE IV

| Run | DMES (g) | AS (g) | Photoinitiator (g) | Photoinitiator (%) | Allyl/SH | $n_D^{25}$ before UV exposure | $n_D^{25}$ after UV exposure | Allyl conversion (%) | Yield (%) | $n_D^{25}$ of precipitated polymer | $\overline{M}_n$ (g · mol$^{-1}$) |
|---|---|---|---|---|---|---|---|---|---|---|---|
| PS14 | 10.9512 | 4.0532 | 5 × 0.1602 | 5.068 | 0.500 | 1.5642 | 1.6072 | 95 | 72.1 | 1.6125 | 650 |
| PS15 | 9.7001 | 5.3094 | 5 × 0.1554 | 4.921 | 0.740 | 1.5581 | 1.6067 | 90 | 76.5 | 1.6122 | 860 |
| PS16 | 8.9964 | 5.9973 | 5 × 0.1579 | 5.002 | 0.901 | 1.5488 | 1.6064 | 87 | 80.3 | 1.6092 | 1080 |
| PS17 | 8.6277 | 6.3654 | 5 × 0.1578 | 5.001 | 0.997 | 1.5480 | 1.6044 | 80 | 75.1 | 1.6106 | 1100 |
| PS18 | 8.6247 | 6.3781 | 5 × 0.1597 | 5.054 | 0.999 | 1.5432 | 1.6032 | 81 | 64.8 | 1.6112 | 1070 |
| PS19 | 8.5813 | 6.4342 | 5 × 0.1562 | 4.944 | 1.013 | 1.5464 | 1.6065 | 86 | 74.4 | 1.6124 | 1050 |
| PS20 | 8.2525 | 6.7829 | 5 × 0.1609 | 5.080 | 1.111 | 1.5402 | 1.6052 | 84 | 73.0 | 1.6105 | 1120 |
| PS21 | 7.4855 | 7.5026 | 5 × 0.1583 | 5.015 | 1.354 | 1.5348 | 1.6058 | 85 | 71.0 | 1.6116 | 1320 |

UV exposure = 5 × 210 s at 50 mW except (6 × 210 + 180 + 180 s) (Fusion System)
$\overline{M}_n$ was measured by Gas peak chromatography (GPC)

The SH content of the polysulfides was measured by titration using iodine. As expected, the SH content decreased with the increase of the Allyl/SH molar ratio. When Allyl/SH=0,5, the end groups consist almost exclusively of SH, and the value of $\overline{M}_n$ calculated from the SH content assuming 100% SH end groups is very close to the one measured by GPC.

1.5 Preparation of Polysulfide PS22

In a 100 ml three necked flask equipped with a magnetic stirrer, a heating mantle, an inlet for an inert gas on one port and a condenser on another port, we introduce 30.2016 g DMES, 16.4094 g Allyl sulfide (Allyl/SH=0.734) and 2.6250 g 2,2'-Azobisisobutyronitrile (AIBN) previously dried, received from Monomer-Polymer and Dajac Laboratories, Inc.

II. Example of Synthesis of an (α, ω)-diiso(thio)cyanate Prepolymer (III) from a Polysulfide of Formula (Ic)

The synthesis of these prepolymers was carried out under a blanket of dry nitrogen, at different temperatures, in the presence or absence of dimethyltindichloride catalyst. Several NCO/SH molar ratios were used. The reaction was followed by infra-red spectrometry for the NCO conversion (NCO signal at 2262 cm$^{-1}$), Raman spectroscopy for the SH conversion (SH signal at 2520 cm$^{-1}$) and by measuring the refractive index. After the reaction was stopped (by removing the heat source), the NCO content of the prepolymers was measured by titration.

Starting components, quantities and reaction conditions are given in Table V below.

TABLE V

| NCO-terminated prepolymer | Polysulfide | Polysulfide (g) | Desmodur ®W (g) | Reaction Temperature (° C.) | Reaction Time (hrs) | At the end of reaction % NCO res. (FTIR) | At the end of reaction % SH res. (RAMAN) | $n_D^{25}$ after synthesis |
|---|---|---|---|---|---|---|---|---|
| 1 | PS10 | 52.10 | 39.72 | 110 | 144 | 73.8 | 3.5 | 1.5760 |
| A | LP-33 | 146.71 | 116.09 | 110 | 41 | 75.7 | 6.5 | 1.5411 |

The mixture is heated to 65° C. Stirring was continued until the FTIR signal at 1636 cm$^{-1}$ corresponding to the allyl groups disappeared (43 hours). This shows that AIBN is an effective initiator. The refractive index $n_D^{25}$ of the mixture at this time was 1.6092. This product is dissolved in about 46 g Desmodur® W was provided by BAYER:
Physical state: slurry at RT (melting point: 40-50° C.)
Purity (NCO titration): 97.3% (NCO content measured was 31.2%, 31.8% according to Bayer)
Refractive index $n_D$ at 45° C.: 1.4950
Specific gravity at 25° C.: 1.07

III. Preparation of the Poly(Thio)Urethane/Urea Material

NCO terminated prepolymer 1 obtained in step II above was reacted with Ethacure®-300 (which is a 80:20 mixture of the 2,4- and 2,6-isomers of dimethylthiotoluenediamine), and filled into −2.000 dioptries glass molds to make a lens. The experimental conditions of the casting and the properties of the lenses are reported in Tables VI and VII. They show that the use of the polysulfide PS10 allows to reach a refractive index of 1.615, a good impact resistance.

Ethacure®-300 monomer was provided by Albermarle Corporation. It is an approximate 80:20 mixture of the 2,4- and 2,6-isomers of dimethylthiotoluenediamine, and has the following characteristics:
Physical state: liquid
Color: clear amber, darkens with time, upon exposure to air
Refractive index $n_D$ at 25° C.: 1.6642
Specific gravity at 20° C.: 1.208
Viscosity at 20° C.: 690 cSt

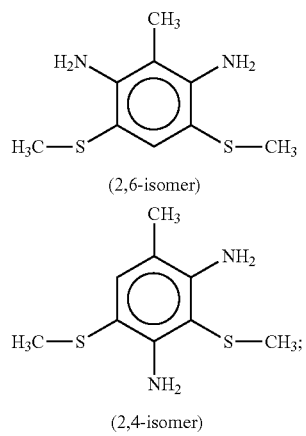

The results of Table VII show that the material of the invention exhibits both a higher refractive index and high impact resistance.

Impact energy (Dynatup) was measured using an impact test machine designed by General Research Corp. (Model 8210 Drop Weight Impact Test Machine). This machine has the capability to test materials over a wide range of velocities and energies. The velocities can reach up to 4.5 m/sec with a maximum standard drop eight of 36 inches. The cross-head weight can vary from approximately 4.1 to 27 kg.

E' modulus is measured by dynamic mechanical analysis (DMA) using a Perkin Elmer DMA 7e equipment (3-point bending, heat from 5° C. to 180° C. at 2° C./min and a frequency of 1 Hz).

IV. Examples of Synthesis of Polysulfides of Formula (Ie)

The following (α, ω)-diol polysulfide prepolymers of formula (Ie) have been prepared (m=1):

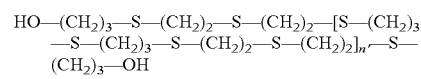

IV.1

Compound (Ie) was obtained by reacting in a first step the appropriate amounts of dimercaptoethylsufide (DMES) and allyl sulfide (AS) in the presence of 5.3% by weight of the polymerizable monomers of a thermal radical initiator, azo-bisisobutyronitrile (AIBN). The mixture was heated at 65° C. for 48 h.

32.24 g of DMES, 17.64 of allyl sulfide and 2.7953 g of AIBN were mixed in a three neck flask, allowing 1 port for nitrogen purging, 1 port for a condenser, and 1 port for chemical addition/sampling. The disappearance of the allyl group was verified by FTIR at 917 cm$^{-1}$, corresponding to the vinyl C—H groups. The stability of the RI of the polymer mixture was also checked.

In a second step, the resulting polysulfide (α, ω)-dithiol prepolymer of formula (Ic) was then reacted with a slight excess of allyl alcohol (10 mol % excess of allyl alcohol based

TABLE VI

| | NCO Prepolymer 1. (g) | Ethacure ® 300 (g) | Molar ratio NH2/ NCO. | Degas Time. (mn) | Degas Temp. (° C.) | Mix. Time (mn) | Mix. Temp (° C.) | Cure Cycle |
|---|---|---|---|---|---|---|---|---|
| Example 1 | 30.1799 | 5.9137 | 0.940 | 30 | 110 | 3 | 110 | 8 hrs/130° C. |

Degas: degassing
Mix: Mixing

TABLE VII

| Run | NCO Pre-polymer | Formulations (Prepolymer + Amine) | NH$_2$/ NCO | Index ($n_D^{25}$) | Density | Dynatup Impact/ Center thickness of the −2.00 lens | Soft. Temps* | Modulus (E') at 25° C.** | Modulus (E') at 100° C. |
|---|---|---|---|---|---|---|---|---|---|
| Example 1 | 1 | 83.62% + 16.38% | 0.940 | 1.615 | 1.21 | 133 in-lb/1.16 mm (1.532 kg · m) | >80° C. | 8.1 × 10$^8$ Pa | 1.7 × 10$^8$ Pa |
| Example A (comparative) | A | 79.2% + 20.1% | 0.931 | 1.592 | 1.25 | 111 in-lb/1.30 mm (1.279 kg · m) | >80° C. | — | |
| Example B (comparative) | A | 79.86% + 20.14% | 0.932 | 1.592 | 1.25 | 160 in-lb/2.10 mm (1.843 kg · m) | >80° C. | 8 × 10$^8$ Pa | 2 × 10$^8$ Pa |

*The −2.00 lens had no deformation under a certain force by hand in Oven of 80° C. (softening temperature >80° C.).
**The modulus was measured by DMA.

on the amount of SH groups in the (α, ω)-dithiol prepolymer of formula (Ic)) to produce compound of formula (Ie).

50.58 g of (α, ω)-dithiol prepolymer of formula (Ic), 6.68 g of allyl alcohol and 1.4315 g of AIBN (2.5% by weight of the polymerizable monomers) were heated at 65° C. for 24 h in a three neck flask, allowing 1 port for nitrogen purging, 1 port for a condenser, and 1 port for chemical addition/sampling. The reduction of the allyl and SH groups was verified by FTIR.

The crude product was dissolved in approximately 53 mL of tetrahydrofuran at 45° C. and then precipitated by adding dropwise the obtained solution in approximately 2 L of methanol. The polysulfide of formula (Ie) was filtered and dried in an oven at 40° C. for 24-48 hrs.

Its number average molecular weight was calculated by ASTM E1899-08 for hydroxyl number (Mn=1329 g/mol) and by GPC (Mn=1380 g/mol). Mw/Mn (GPC) was 1.85.

IV.2

Protocol IV.1 was reproduced except that, in the first step, there was used 34.15 g of DMES, 19.04 g of allyl sulfide and 3.0047 g of AIBN.

Then in a second step, 56.19 g of this (α, ω)-dithiol prepolymer was reacted with 6.87 g of allyl alcohol and 1.5905 g of AIBN.

The polysulfide obtained had a number average molecular weight calculated by GPC (Mn=1478 g/mol). Mw/Mn (GPC) was 1.91

V. Examples of Synthesis of (α, ω)-diiso(thio)cyanate Prepolymers (III) from Polysulfides of Formula (Ie)

V.1

A prepolymer (III) was obtained without adding to the mixture any thermal initiator from a polysulfide of formula (Ie) obtained in IV.1 and a cycloaliphatic diisocyanate of formula (II), namely 4,4'-methylenebis(cyclohexyl isocyanate) supplied by Sigma-Aldrich. It is a mixture of several isomers and it is also commercially known as Desmodur® W from Bayer.

Based on Mn=1329, 25.01 g of hydroxy terminated polysulfide of formula (Ie) was placed into a three neck flask, allowing 1 port for nitrogen purging, 1 port for a condenser, and 1 port for chemical addition/sampling. Afterwards, 16.46 g of 4,4'-methylenebis(cyclohexyl isocyanate), corrected for assay, (14.81 g of pure HMDI) was added, all at room temperature (approximately 3 to 1 molar ratio of NCO to OH). The reaction flask was lowered into a hot oil bath on a hot plate and stirred while the contents heated to ~110° C. and melted the waxy hydroxy terminated polysulfide.

The mixture was mixed for around 5 hrs and sampled intermittently for FTIR. The reduction of the NCO peak was observed to monitor the reaction. The resulting NCO terminated prepolymer III was titrated for NCO using a classical amine back titration procedure and found to be $2.17 \cdot 10^{-3}$ moles NCO/g sample.

V.2

A prepolymer III was obtained from the polysulfide obtained in IV.2 with a 3:1 excess of isocyanate using the same protocol as described in V.1.

The resulting NCO terminated prepolymer III was titrated for NCO and found to be $1.91 \cdot 10^{-3}$ moles NCO/g sample.

Example 2

Preparation of a Lens 16.0 g of the NCO terminated prepolymer III obtained in part V.2 above were mixed with 3.1 g of Albemarle Ethacure 300™ amine (molar ratio $NH_2/NCO=0.94$) as follows, and cured for 8 hours at 130° C. to make a −2.00 power lens.

The NCO terminated prepolymer was placed into a jar and warmed using a heat gun. A stir bar was placed into the jar and the jar was then placed on a 80° C. hot plate for ~20 minutes, without stirring, to melt the solid, all the while in a dry nitrogen atmosphere. After melting, nitrogen was discontinued and vacuum was applied, while stirring at 50 rpm, for around 30 minutes. Vacuum was reduced using nitrogen and the Ethacure 300™ was added by syringe while in a nitrogen atmosphere. The solution was mixed (50 rpm) for ~2 minutes under vacuum. Vacuum was reduced using nitrogen and one −2.00 glass lens mold was filled. The mold had been previously warmed to 100° C. It was cured for 8 hours at 130° C.

The refractive index $n_D^{25}$ of the obtained lens was 1.603. Its density was 1.21.

The invention claimed is:

1. A transparent, non-elastomeric, poly(thio)urethane/urea material comprising the reaction product of:
   (a) at least one (α, ω)-diiso(thio)cyanate polysulfide prepolymer, said prepolymer being free from disulfide (—S—S—) linkage; and
   (b) at least one aromatic primary diamine, in an equivalent molar ratio amine function/iso(thio)cyanate function ($NH_2/NCX$, X=O, S) ranging from 0.5 to 2, said aromatic primary diamine being free from disulfide (—S—S—) linkage,
   wherein the (α, ω)-diiso(thio)cyanate polysulfide prepolymer is the reaction product of at least one cycloaliphatic or aromatic diiso(thio)cyanate and at least one (α, ω)-diol prepolymer, and wherein the (α, ω)-diol prepolymer contains at least one sulfur atom in its chain.

2. The material of claim 1, wherein the equivalent ratio $NH_2/NCX$ ranges from 0.90 to 1.10.

3. The material of claim 1, wherein the equivalent ratio $NH_2/NCX$ ranges from 0.93 to 0.95.

4. The material of claim 1, wherein said (α, ω)-diol prepolymer is a polysulfide or a mixture of polysulfides.

5. The material of claim 4, wherein the polysulfide or mixture of polysulfides is a polysulfide of formula (Id):

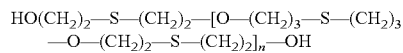

in which n is an integer ranging from 1 to 6.

6. The material of claim 4, wherein the polysulfide or mixture of polysulfides is a polysulfide of formula (Ie):

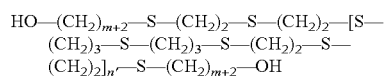

wherein m is an integer ranging from 1 to 4, and n' is an integer ranging from 1 to 6.

7. The material of claim 4, wherein the polysulfide or mixture of polysulfides is a polysulfide of formula (If):

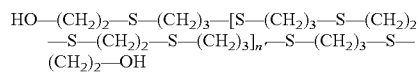

wherein n' is an integer ranging from 1 to 6.

8. The material of claim 1, wherein the aromatic diamine contains at least one sulfur atom in its molecule.

9. The material of claim 8 wherein the diamine is selected from:

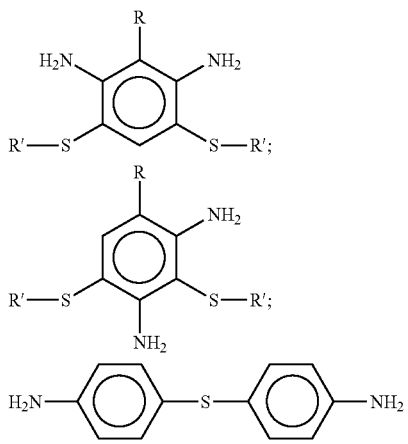

in which R is H or an alkyl group and R' is an alkyl group, and mixtures of the above diamines.

10. The material of claim 9, wherein the diamine is a mixture of by weight relative to the weight of said diamine:

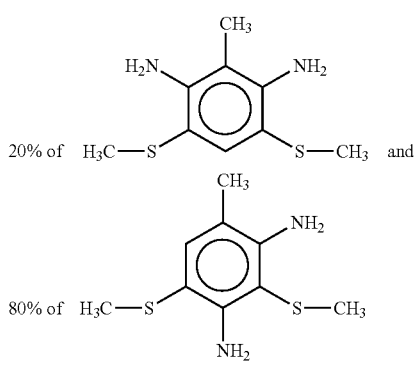

11. The material of claim 1, wherein the material is the reaction product of:
a) said at least one ($\alpha$, $\omega$)-diiso(thio)cyanate polysulfide prepolymer;
b) said at least one aromatic primary diamine; and
c) at least one di-, tri-, or tetra alcohol, or at least one di-, tri-, or tetra thiol, or a mixture thereof.

12. The material of claim 11, wherein the alcohols and thiols are selected from the group consisting of:

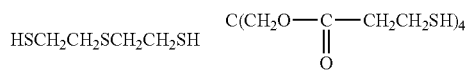

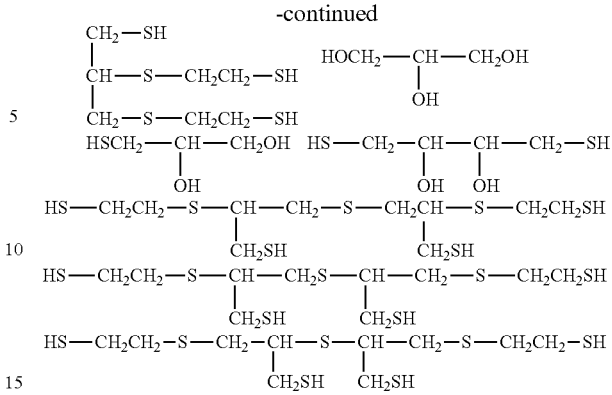

and mixtures thereof.

13. The material of claim 1 having a refractive index, $n_D^{25}$, higher than 1.53.

14. The material of claim 1 having a refractive index, $n_D^{25}$, of at least 1.55.

15. The material of claim 1 having a refractive index, $n_D^{25}$, of at least 1.57.

16. The material of claim 1, wherein the at least one ($\alpha$, $\omega$)-diiso(thio)cyanate polysulfide prepolymer has a number average molecular weight of not more than 3000 g mol$^{-1}$.

17. An optical article made from a material according to claim 1.

18. The optical article of claim 17, wherein said article is selected from the group consisting of sun lenses, ophthalmic lenses and protective lenses.

19. A transparent, non-elastomeric, poly(thio)urethane/urea material comprising the reaction product of:
(a) at least one ($\alpha$, $\omega$)-diiso(thio)cyanate polysulfide prepolymer, said prepolymer being free from disulfide (—S—S—) linkage; and
(b) at least one aromatic primary diamine, in an equivalent molar ratio amine function/iso(thio)cyanate function (NH$_2$/NCX, X=O, S) ranging from 0.5 to 2, said aromatic primary diamine being free from disulfide (—S—S—) linkage,
wherein the ($\alpha$, $\omega$)-diiso(thio)cyanate polysulfide prepolymer is the reaction product of at least one cycloaliphatic or aromatic diiso(thio)cyanate and at least one ($\alpha$, $\omega$)-diol prepolymer,
wherein the material is the reaction product of:
a) said at least one ($\alpha$, $\omega$)-diiso(thio)cyanate polysulfide prepolymer;
b) said at least one aromatic primary diamine; and
c) at least one di-, tri-, or tetra alcohol, or at least one di-, tri-, or tetra thiol, or a mixture thereof.

* * * * *